(12) United States Patent
Shan

(10) Patent No.: US 7,756,676 B1
(45) Date of Patent: Jul. 13, 2010

(54) DETECTING DATA CHANGE BASED ON ADJUSTED DATA VALUES

(75) Inventor: Jerry Z. Shan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 490 days.

(21) Appl. No.: 11/273,696

(22) Filed: Nov. 14, 2005

(51) Int. Cl.
*G06F 19/00* (2006.01)

(52) U.S. Cl. .................................................. 702/182

(58) Field of Classification Search .................. 702/182
See application file for complete search history.

(56) References Cited

U.S. PATENT DOCUMENTS

| | | | | |
|---|---|---|---|---|
| 5,676,690 | A | * | 10/1997 | Noren ............................ 607/9 |
| 2002/0169658 | A1 | * | 11/2002 | Adler ........................... 705/10 |
| 2003/0018501 | A1 | * | 1/2003 | Shan ............................. 705/7 |
| 2003/0233273 | A1 | | 12/2003 | Jin et al. |
| 2004/0015458 | A1 | | 1/2004 | Takeuchi et al. |

OTHER PUBLICATIONS

Daniel Kifer, Shai Ben-David, Johannes Gehrke, Detecting Change in Data Streams, Department of Computer Science Cornell University, Proceedings of the 30th VLDB Conference, Toronto, Canada, Aug. 31-Sep. 3, 2004, p. 180-191.*
VLDB 2004—30th Int. Conf. on Very Large Data Bases, Aug. 31-Sep. 3, 2004, p. 3.*
Shan et al., U.S. Appl. No. 10/322,201, entitled "Method and System for Predicting Revenue Based on Historical Pattern Identification and Modeling," filed Dec. 17, 2002, pp. 1-22, Figs. 1-8.
Shan et al., U.S. Appl. No. 10/355,353, entitled "Method and System for Constructing Prediction Interval Based on Historical Forecast Erros," filed Jan. 31, 2003, pp. 1-21, Figs. 1-6.
Shan et al., U.S. Appl. No. 10/959,861, entitled "Methods and Systems for Cumulative Attribute Forecasting Using A PDF of a Current-To-Future Value Ratio," filed Oct. 6, 2004, pp. 1-18, Figs. 1-6.
BEA WebLogic Server Capacity Planning Guide, Rel. 8.1, 54 pages, Jun. 16, 2003.
J.Z. Shan, "Sequential Detection of Parameter Changes in Linear Dynamic Systems and Regression Models," pp. 1-75 (1995).
J. Shan, U.S. Appl. No. 11/047,283, entitled "Detecting Change in Data," filed Jan. 31, 2005, pp. 1-26, Figs. 1-6.
J. Shan, U.S. Appl. No. 11/047,231, entitled "Performing Quality Determination of Data," filed Jan. 31, 2005, pp. 1-32, Figs. 1-6.
http://www.stat.yale.edu/Courses/1997-98/101/linreg.htm, "Linear Regression," pp. 1-3 (at least as early as Apr. 6, 2005).
J.Z. Shan, U.S. Appl. No. 11/118,832, entitled "Determining a Time Point Corresponding to a Change in Data Values Based on Fitting with Respect to Plural Aggregate Value Sets," filed Apr. 29, 2005, pp. 1-26, Figs. 1-8.

* cited by examiner

*Primary Examiner*—Tung S Lau (57) ABSTRACT

To detect data change, data values are separated into plural sets. Predefined values representative of a predetermined effect are calculated for respective plural sets. Adjusted data values are calculated by removing impact of calculated predefined values from the data values in the respective plural sets. The data change is detected based on the adjusted data values.

21 Claims, 3 Drawing Sheets

DETECTING DATA CHANGE BASED ON ADJUSTED DATA VALUES

BACKGROUND

Companies or other organizations often gather data into data repositories, such as databases or data warehouses, for analysis to discover hidden data attributes, trends, patterns, or other characteristics. Such analysis is referred to as data mining, which is performed by organizations for planning purposes, for better understanding of customer behavior, or for other purposes.

It is often useful to detect a "structural" or "systematic" change in observed data from a particular data source or database. A "systematic" or "structural" change in data results from some change in a particular system that produced the data, where such change results from an underlying change in the system rather than from changes due to normal operation of the system. The term "systematic change" is often used in the industry context, whereas the term "structural change" is often used in the economics context. In this description, the terms "systematic change" and "structural change" are interchangeably used and refer to any change in data that results from a change in the system that produced the data.

Change-point detection is performed to detect a systematic change in an input data set. Typically, the change-point detection identifies a point in time at which the change occurred. Conventionally, change-point detection has employed a model that assumes a constant mean for observed data values before the change, a different constant mean for the observed data values after the change, and a constant variance for the observed data values. A shift in the constant means or constant variance has conventionally been used as an indication that a systematic change has occurred.

However, in some scenarios, various real-world effects may cause change-point detection to be inaccurate using conventional change-point detection algorithms.

BRIEF DESCRIPTION OF THE DRAWINGS

Some embodiments of the invention are described with reference to the following figures.

DETAILED DESCRIPTION

Figure 1:
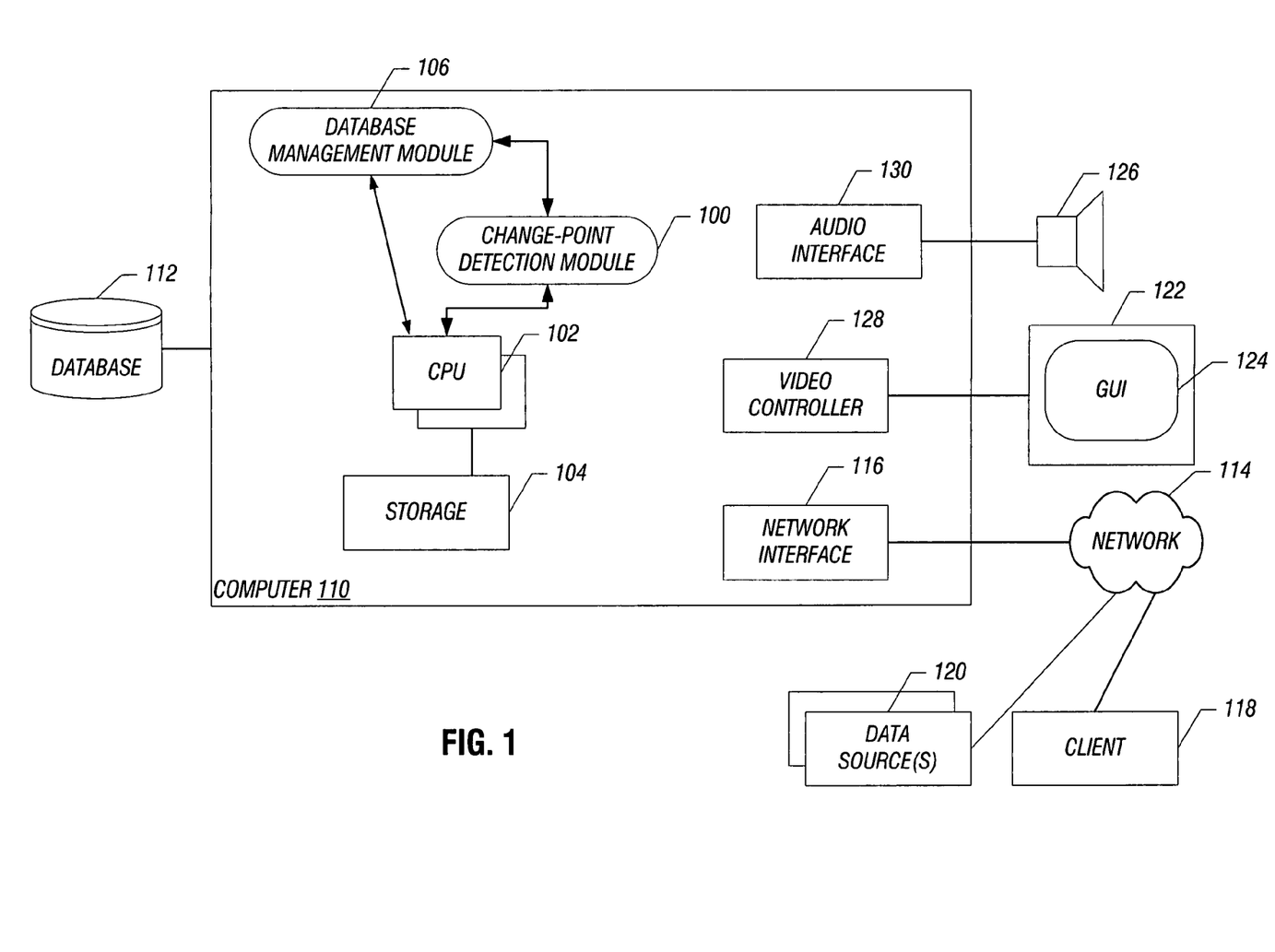
FIG. 1 is a block diagram of a system in which a change-point detection module according to an embodiment is executable.

FIG. 1 shows an example system that includes a change-point detection module 100 that is executable on one or plural central processing units (CPUs) 102 in a computer 110 (or in multiple computers). The computer 110 can be a desktop computer, notebook computer, server computer, personal digital assistant (PDA), or other type of computing device. In some embodiments, the change-point detection module 100 is implemented in software. In other embodiments, the change-point detection module can be implemented in hardware, or a combination of hardware and firmware.

The one or plural CPUs 102 are coupled to a storage 104 (which can include volatile memory or non-volatile memory). The computer 110 also includes a database management module 106 that is executable on the one or plural CPUs 102. Alternatively, the database management module 106 can be executable on a computer that is separate from the computer 110 on which the change-point detection module 100 is executed. The database management module 106 manages the access (read or write) of data stored in a database 112. The database 112 can be implemented in storage device(s) connected to the computer 110, or alternatively, the database 112 can be implemented in a server or other computer coupled over a data network, such as data network 114. Examples of data that can be stored in the database 112 include retail or wholesale sales data, invoice data, production volume data, inventory data, revenue data, financial data, cost data, quality control data, and other forms of data.

The computer 110 communicates over the data network 114 through a network interface 116. Example devices or systems that are coupled to the data network 114 include a client 118 and one or plural data sources 120. The data sources 120 (which can be associated with different organizations, departments within an organization, or other types of entities) are able to collect data that is then transmitted over the data network 114 and through the computer 110 for storing in the database 112.

The change-point detection module 100 checks for a systematic or structural change in data stored in the database 112 or data communicated to the change-point detection module 100 over the data network 114. In response to detecting a systematic or structural change in data, the change-point detection module 100 is able to provide an alert (e.g., an alarm) to a user of a time point (also referred to as a "change point") at which the systematic or structural change in data occurred.

As noted above, a "systematic change" or "structural change" in data results from some change in a particular system that produced the data, where the data change results from an underlying change in the system rather than from data change occurring as a result of normal operation of the system. The term "systematic change" is often used in the industry context, whereas the term "structural change" is often used in the economics context. In this description, the terms "systematic change" and "structural change" are interchangeably used and refer to any change in data that results from a change in the system that produced the data.

In accordance with some embodiments, the change-point detection module 100 detects a change point in a time series of data values (stored in the database 112 or elsewhere) by removing predetermined effects due to some attribute. For example, the attribute can be time, and the effects removed are temporal effects. The data values are separated into plural time windows (e.g., days of the week, months, quarters, years, etc.), and the temporal effect in each time window is removed before change-point detection is applied. For example, data values may exhibit fluctuating patterns dependent upon the days of each week. The data values may indicate higher activity during work days (Monday to Friday) and lower activity during weekend days (Saturday and Sunday). Another example of a temporal effect is a transitory effect, in which data values may exhibit fluctuating patterns due to occurrence of temporary events.

Temporal effects on observed data values are also applicable for other periodically repeating time windows, such as weekly, monthly, or annual time windows. For example, a business may experience fluctuations in demand or supply patterns depending upon the time of year. A business may have very high sales during the months closer to the end of the year (such as during the holiday season), and reduced activity during other months of the year. Such fluctuation based on temporal effects may cause a conventional change-point detection algorithm to incorrectly identify a systematic change as occurring at a particular time point, when in fact the detected reduced or increased data value at the time point is part of the normal pattern of the particular business due to temporal effects.

Another example of a predetermined effect includes a spatial effect (e.g., data values exhibit fluctuations based on geographic locations). Yet another example includes a business sector effect, in which data values fluctuate according to different business sectors. Other predetermined effects include a seasonality effect, gender effect, ethnicity effect, and so forth. More generally, a "predetermined effect" refers to any effect that can cause fluctuation in patterns of data values.

Figure 2:
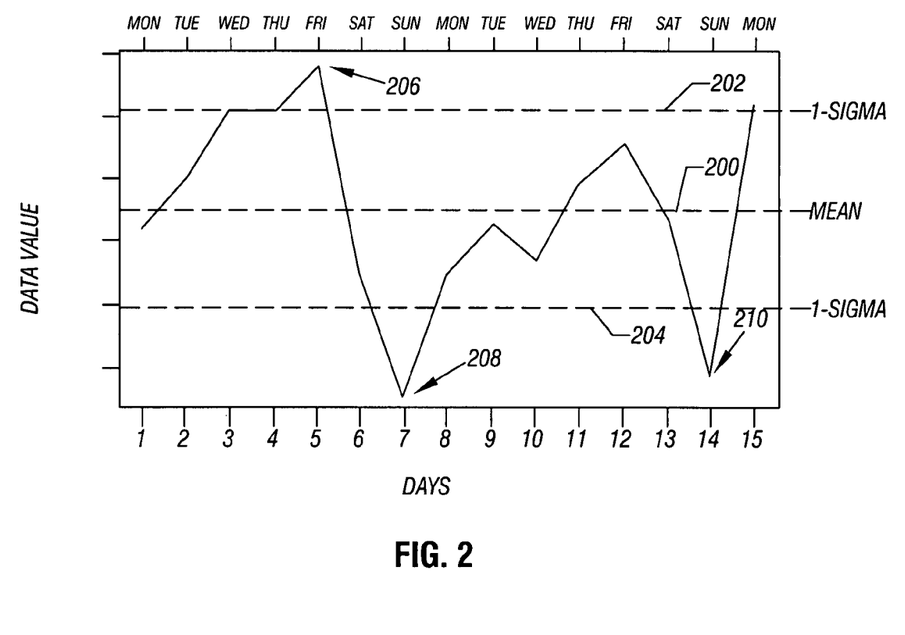
FIG. 2 is a graph showing example data values that fluctuate according to days of the week, which data values can be processed by the change-point detection module for detecting a systematic change in the data values, according to some embodiments.

An example temporal effect is illustrated in the example of FIG. 2, which shows data values in a 15-day period. The data values may represent sales, demand, supply, or any other metric that is being analyzed. In the example of FIG. 2, the data values gradually increase from Monday to Friday, but then fall on Saturday and Sunday. This general pattern is repeated every week. In FIG. 2, the arithmetic mean is represented by horizontal dashed line 200, and one-sigma (1σ) levels are represented by dashed lines 202, 204. The 1σ levels 202, 204 define an interval of data values that are within one standard deviation from the mean 200 in a normal distribution of data values (according to probability theory, about 68% of data values are at one standard deviation from the mean).

Note that in the example depicted in FIG. 2, data values at day 5 (206), day 7 (208), and day 14 (210) are outside the 1σ range. These wide fluctuations of data values according to the days of the week may cause a conventional change-point detection algorithm to incorrectly detect a systematic change, even though such wide fluctuations are a result of normal business operations. Also, a conventional algorithm may incorrectly indicate the data values outside the 1σ range as exhibiting data quality problems.

According to some embodiments, the change-point detection module 100 is able to remove temporal effects of respective time windows before applying change-point detection. The days Monday to Sunday constitute one example of periodically repeating time windows. In other words, Monday repeats every week, Tuesday repeats every week, and so forth. Other examples of periodically repeating time windows include weeks (e.g., weeks 1 to 52 repeat every year), months (e.g., months 1 to 12 repeat every year), quarters, years, and so forth.

Although reference is made to removing temporal effects above, it is contemplated that other types of effects can be factored out prior to applying change-point detection. One example is business trend change analysis, as different geographic regions and business sectors can have different baselines when making judgment about overall change. Therefore, those factors need to be predetermined with their baseline effects (e.g., geographic effects, business sector effects, etc.). Another example is to detect and analyze whether a new drug or a new environmental procedure is effective in reducing the fatality rate for a disease such as chronic obstructive pulmonary disease (COPD). Analysis has shown that seasonality, gender of patients, and ethnicity are three key factors for the fatality rate. Death rates from COPD are greater in the winters than in the summers, greater for men than for women, and greater for people of certain races. In this latter example, observed data values can be adjusted based on seasonality effect, gender effect, and ethnicity effect.

To enable the removal of temporal effects, the change-point detection module 100 separates observed data values into plural sets that correspond to respective periodically repeating time windows. For example, the plural sets can include seven sets for respective days Monday through Sunday of every week. If removal of effects other than temporal effects is to be performed, then the plural sets correspond to other groupings.

In this discussion, an "observed data value" refers to a data value that was observed at a particular time point and received by the change-point detection module 100 (either over the data network 114 or from the database 112). The change-point detection module 100 receives a time series of observed data values for the purpose of applying change-point detection on the time series. "Aggregate values" are computed by performing aggregation of the observed data values. The aggregate values are also represented as a time series. In one embodiment, the aggregate values are cumulative sum values. In other embodiments, other types of aggregate values based on other forms of aggregation (e.g., average, minimum, maximum, etc.) can be employed. Aggregation is used for change-point detection, discussed further below.

Each set is analyzed to find a predefined value or indication (e.g., a mean value) that represents the predetermined effect (e.g., temporal effect) for that set. A "mean value" represents a value occurring within a particular range. Examples of "mean value" include arithmetic mean, median, and any other value occurring with a range. The impact of the predefined value or indication (e.g., mean value) calculated for each set is removed from observed data values of that set to compensate for the predetermined effect (e.g., temporal effect). Adjusted data values for each set are calculated by removing the impact of the predefined value or indication for that set from corresponding observed data values. For example, the adjusted data values can be calculated by subtracting a mean value from the observed data values. The change-point detection is then applied on the adjusted data values rather than the observed data values.

In some implementations, once a change point is detected, an alert provided by the change-point detection module 100 (FIG. 1) can be presented to a display monitor 122 (that is able to display a graphical user interface or GUI 124) or an audio output device 126 of the computer 110. Thus, the change-point detection module 100 is able to provide either a visual and/or audio alert to a user in response to a systematic change in data. The display monitor 122 is coupled to a video controller 128 in the computer 110, and the audio output device 126 is coupled to an audio interface 130 in the computer 110. Alternatively, the change-point detection module 100 is also able to communicate an alert of a systematic change over the data network 114 to a remote computer, such as the client 118. The alert enables a user to act upon the systematic change in data. The alert can be in the form of a report or other indication.

Figure 3:
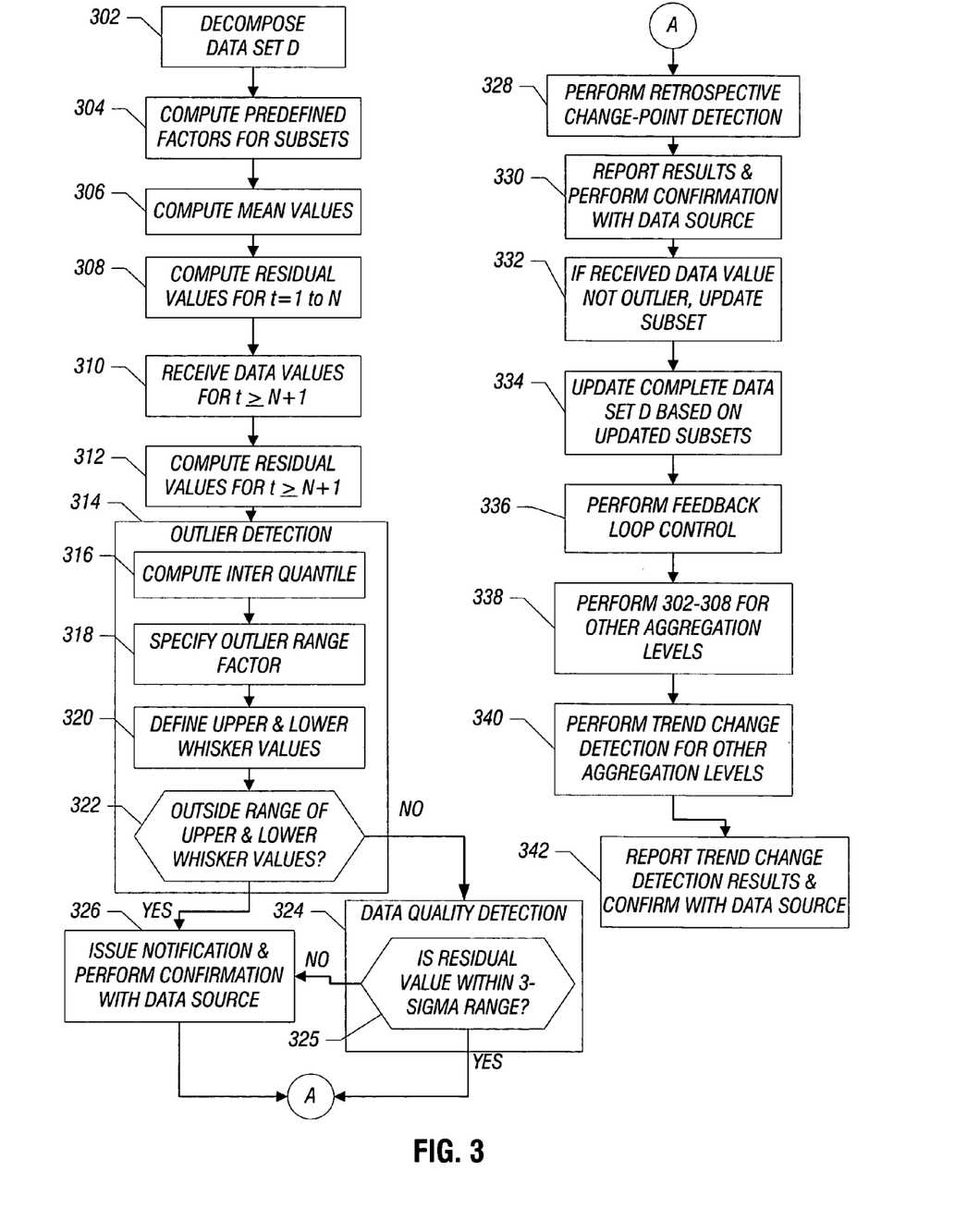
FIG. 3 is a flow diagram of a process performed by the change-point detection module according to an embodiment.

FIG. 3 shows a process performed by the change-point detection module 100 (FIG. 1) in accordance with an embodiment for detecting a systematic change. A systematic change may be indicated by a change in mean level (i.e., a first mean level before a change point, and a second, different mean level after a change point). Alternatively, a systematic change can be indicated by other changes, such as changes in the slope of cumulative sums, or other changes of other types of aggregations.

A historical data set containing a time series of observed data values is represented as $\{y_t: t=1, 2, \ldots, N\}$, where t represents a time point (which can indicate a day, hour, week, and so forth). In the ensuing discussion, the time point t is assumed to represent a day. Thus, the observed data values $\{y_t: t=1, 2, \ldots, N\}$ represent data values starting at day 1 up to day N. The input data set containing the time series of observed data values is represented as $D=\{y_t: t=1, 2, \ldots, N\}$.

Note that the input data set may have been processed previously to ensure that the data values are reliable to enhance the quality of solutions provided by the change-point detection module 100 according to an embodiment. As an example, reliability can be enhanced by confirming with a data source (e.g., data source 120 in FIG. 1) that the data set of values is accurate. In the example embodiment depicted in FIG. 3, the temporal effects to be removed are effects of days of the week (Monday through Sunday). The technique depicted in FIG. 3 is applicable to removing other types of effects in other repeating sets, whether temporal or otherwise.

The data set D is decomposed (at 302) into plural subsets $D_k$, k=1, 2, ..., K, which subsets are stored in a storage (e.g., storage 104 in FIG. 1). In this example, there are seven subsets to correspond to seven days of the week. The seven subsets are represented as $D_k$, where k=1, 2, ..., 7, with k=1 corresponding to Monday k=2 corresponding to Tuesday, and so forth. In other embodiments, the value of k can range from 1 to other values of K.

Mathematically, the decomposition of the data set D is represented as $$D = \bigcup_{k=1}^{K} D_k.$$

Thus, for example, if there are 52 weeks of observed data values contained in the historical data set D, then each subset $D_k$ will include 52 observed data values corresponding to the particular day of the week.

Next, the change-point detection module 100 computes (at 304) predefined factors for each subset $D_k$. Examples of predefined factors that are computed include the arithmetic mean, median, standard deviation, 95% confidence interval for the mean, and 25% and 75% quantiles. The 95% confidence interval for the mean represents the interval within each subset $D_k$ in which 95% of the data values in the subset reside. A quantile is a specific value of a variable that divides a distribution into two parts, those values greater than the quantile value and those values that are less. For example, p percent of values in a distribution are less than the p-th quantile.

Figure 4:
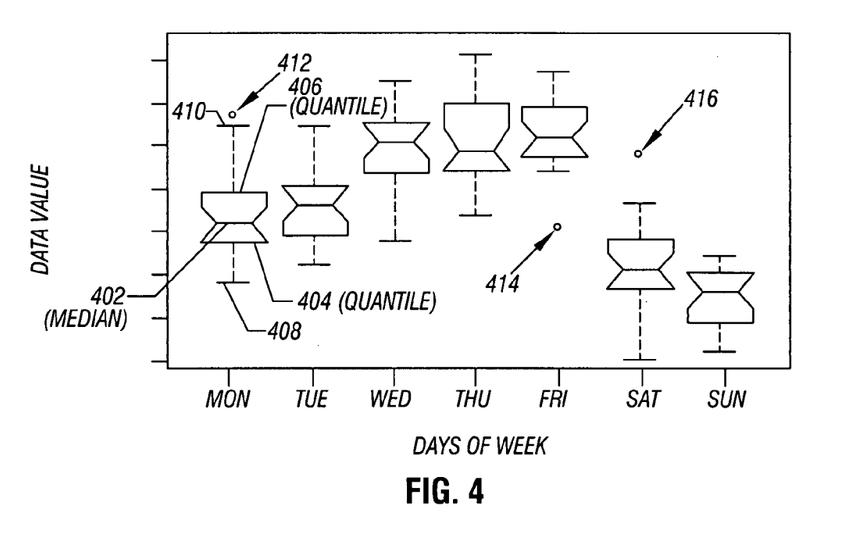
FIG. 4 is a box plot chart illustrating various values used by the change-point detection module according to an embodiment.

A box plot graph representing the various predefined factors computed at 304 are illustrated in FIG. 4. For Monday, the median value is represented by a line 402, and the 25% and 75% quantiles are represented by lines 404 and 406, respectively. Lines 408 and 410 represent lower and upper whisker values, respectively (described further below). In one implementation, the upper and lower whisker values are not computed at 304, but rather are computed later.

Note that similar structures exist for the other days of the week (Tuesday through Sunday), as depicted in FIG. 4. FIG. 4 also shows outlier data values 412, 414, and 416, which occur on Monday, Friday, and Saturday, respectively. An "outlier" value represents a data value that is outside some predefined range, which in FIG. 4 is the range defined by the upper and lower whisker values (410 and 408, respectively, for Monday). Whisker values are similarly defined for the subsets representing the other days of the week. As explained below, outlier detection within a subset is used to determine the data quality of an observed data value.

The change-point detection module 100 next computes (at 306 in FIG. 3) the mean value $\bar{y}^{(k)}$ for each subset $D_k$, where the "mean value" represents a value within a predefined range, such as an arithmetic mean, median, or some other value within a range. Seven mean values $\bar{y}^{(k)}$ are computed for the seven days of the week, k=1, 2, ..., 7. In the example of FIG. 4, each mean value $\bar{y}^{(k)}$ can be set at the median value for the respective subset (such as median value 402 in the Monday subset). In other implementations, the mean value $\bar{y}^{(k)}$ for each subset $D_k$ can be set at other values, such as the arithmetic mean of data values in the subset $D_k$ or some other value within a range of values. The mean value $\bar{y}^{(k)}$ represents the effect (e.g., temporal effect) that is to be removed from observed data values within the respective subset $D_k$, for more accurate change-point detection that factors out temporal or other effects.

For the observed data values in the historical data set D, temporal effects of the days of the week are removed by computing (at 308): $r_t = y_t - \bar{y}^{(k)}$, where $r_t$ represents a residual value at time point t that is equal to the difference between the observed data value $y_t$ at time point t and the corresponding mean value $\bar{y}^{(k)}$. For each observed data value $y_t$, one of the seven mean values $\bar{y}^{(k)}$ is selected based on which subset $D_k$ the observed data value $y_t$ belongs to. For example, if the observed data value $y_t$ is a data value occurring on a Tuesday, then the mean value selected to subtract from $y_t$ is $\bar{y}^{(2)}$. The residual values $r_t$ are arranged as a time series $\{r_t: t=1, 2, \ldots, N\}$, for use in performing change-point detection as described further below.

The residual data values $r_t$ are one embodiment of adjusted data values described above on which change-point detection is applied.

The above procedure describes processing to perform calculation of mean values $y_t^{(k)}$ and residual values $r_t$ based on the content of the historical data set D (t=1 to N). Time point t=1 represents the initial time point at which the analysis is to begin, whereas time point N represents the time point at which the historical data set ends. Note that additional members are added to the historical data set as the change-point processing proceeds.

Next, additional observed values $y_t$ for $t \geq N+1$ are received (at 310). Note that each additional observed data value $y_t$ corresponds to one of the time windows (represented by a respective subset $D_k$). These values received at 310 are new observed data values that are not yet part of the historical data set D. The change-point detection module 100 performs data quality detection and change-point detection on the newly received data values, with the change-point detection module adding an observed data value to the data set D if the quality of the data value is confirmed, as discussed further below.

For each newly received data value $y_t$ for $t \geq N+1$, the corresponding residual value (at 312) is calculated according to $r_t = y_t - \bar{y}^{(k)}$. At this point, residual values have been calculated from t=1 to the current time point ($t \geq N+1$).

Next, outlier detection is performed (at 314) for the purpose of determining the data quality of the newly received observed data value $y_t$ for $t \geq N+1$. In the outlier detection procedure, the change-point detection module 100 computes (at 316) an inter quantile, which is equal to the difference between the upper quantile and the lower quantile (e.g., upper quantile 406 and lower quantile 404 for the Monday subset in FIG. 4) for the particular subset $D_k$. In one example implementation, the upper quantile is the 75% quantile, while the lower quantile is the 25% quantile. In different embodiments, different percentage quantiles can be used.

Next, the change-point detection module 100 specifies (at 318) an outlier range factor, which can be any predefined constant, such as 1.5, 2.5, 3.5, and so forth. The outlier range factor is used to expand the inter quantile value for computing the upper and lower whisker values.

The change-point detection module 100 defines upper and lower whisker values (at 320), where the lower whisker value is the minimum data value $y_t$ in the subset $D_k$ that is no less than a value equal to (lower quantile−inter quantile*outlier range factor), and the upper whisker value is the maximum data value $y_t$ in the subset $D_k$ that is no greater than a value equal to (upper quantile+inter quantile*outlier range factor). Note that the lower and upper whisker values can be defined differently in other embodiments.

The change-point detection module 100 next determines (at 322) if the newly observed data value $y_t$, $t \geq N+1$, is outside the range of the upper and lower whisker values. If so, then a possible outlier has been detected and the change-point detection module 100 issues (at 326) a notification to some predefined destination (e.g., data source 120 in FIG. 1) associated with a user or organization to report the possible outlier to the user or organization. The change-point detection module 100 can confirm with a data source whether the particular data value is in fact an outlier. An outlier is an indication that the observed data value $y_t$ may be an erroneous value (in other words, an observed data value exhibiting poor data quality). Occurrence of an outlier is indicative of a data quality issue that may render change-point detection inaccurate. Note that the data source may report that the observed data value preliminarily determined to be outlier based on the outlier detection (314) is in fact not an outlier, but an actual observed data value. If such a report is received back from the data source, then the change-detection module 100 will mark the observed data value $y_t$ as a normal value rather than an outlier.

If the newly observed data value is determined (at 322) not to be outside the range defined by the upper and lower whisker values, then the change-point detection module 100 performs (at 324) data quality detection that determines whether the value of a residual time series at the new time point ($r_t$ calculated at 312) is determined (at 325) to be within a 3σ range. Note that the 3σ range for observed data values is ($\bar{y}^{(k)}-3\sigma_k$, $\bar{y}^{(k)}+3\sigma_k$), where $\bar{y}^{(k)}$ and $\sigma_k$ represent the arithmetic mean and the standard deviation, respectively, of the observed data values $y_t$ in a respective subset $D_k$. The 3σ range for residual data values $r_t$ is ($-3\sigma_k$, $3\sigma_k$), with the usual technical assumption that the sample mean $\bar{y}^{(k)}$ is the unbiased estimate for the population mean $\mu_k$ of the subset $D_k$.

A residual value being outside a 3σ range is indicative that some data quality issue may be associated with the corresponding observed data value $y_t$. An outlier detected at 314 is indicative of a larger problem than a residual value being outside the 3σ range, which is why the outlier detection (314) is performed first before the data quality detection (324).

If the residual value is outside the 3σ range, then the change-point detection module (100) issues (at 326) a notification and performs confirmation with a data source. Again, the data source can either confirm that the respective data value $y_t$ is erroneous, or the data source can report that the data value $y_t$ is a correct value.

Instead of determining whether a residual value is outside a 36 range to determine the data quality of the corresponding observed data value $y_t$, the change-point detection module 100 can perform other types of determinations, such as determining whether the residual value or observed data value is outside a 95% confidence interval.

One action that can be taken in response to the data source confirming that the observed data value is erroneous is to have the data source communicate the actual data value for the time point in question, so that the change-point detection to be applied by the change-point detection module is more accurate.

Once the data quality of the observed data value $y_t$ received at $t \geq N+1$ has been confirmed, the change-point detection module 100 performs (at 328) retrospective change-point detection by applying one of plural possible change-point detection algorithms on the time series of residual values. Note that the application of change-point detection on residual values $r_t$ rather than observed data values $y_t$ allows change-point detection to be based on adjusted data values (in the form of residual values in one embodiment) where temporal effects (or other effects) have been removed. "Retrospective" change-point detection means that the change-point detection can be either performed on the day that a new observed data value $y_t$ is received, or after a few days (in which case the change-point detection looks back at several days of new data).

If the change-point detection is to be applied after several days of newly observed data values, then the tasks at 310-326 are repeated for each successive observed data value $y_t$.

Examples of change-detection algorithms that can be employed by the change-point detection module 100 include change detection using a quality control chart technique that is based on the 1σ, 2σ, or 3σ principle, a cumulative sums (CUSUM) technique, a generalized likelihood ratio (GLR) technique; a regression CUSUM technique; or any other change-point detection algorithm.

The quality control chart technique checks to determine if a predetermined number (e.g., three or greater) of consecutive residual data values $r_t$ are outside a 1σ, 2σ, or 3σ range (1σ, 2σ, or 3σ is selected based on level of accuracy desired by a user). If a predetermined number of residual data value $r_t$ are outside the 1σ, 2σ, or 3σ range, then a change point has been identified.

The CUSUM detection technique computes cumulative sums based on the residual values $r_t$. A change in slope of the cumulative sums in combination with the cumulative sums crossing one or more predefined thresholds constitute an indication of a change point. Example CUSUM techniques are described in U.S. Ser. No. 11/119,037, entitled "Detecting Change in Data," by Jerry Z. Shan, filed Apr. 29, 2005; and U.S. Ser. No. 11/117,989, entitled "Performing Quality Determination of Data," by Jerry Z. Shan, filed Apr. 29, 2005.

The GLR technique calculates a ratio of the likelihood of residual data values based on a model with a change in a mean level to the likelihood of observed data values based on a model without the change in mean level (e.g., a zero mean level). Detection of a change point is based on the ratio crossing over a threshold. An example GLR technique is described in U.S. Ser. No. 11/117,989, referenced above.

The regression CUSUM technique performs linear fitting (in other type of fitting) to fit line segments onto respective multiple sets of curve segments representing CUSUM values (cumulative sums of the residual value $r_1$). An optional fit of the line segments onto a set of curve segments (as compared to other sets of curve segments) identifies the change point. An example regression CUSUM technique is described in U.S. Ser. No. 11/118,832, entitled "Determining a Time Point Corresponding to a Change in Data Values Based on Fitting with Respect to Plural Aggregate Value Sets," by Jerry Z. Shan, filed Apr. 29, 2005. A benefit of the regression CUSUM technique is that thresholds to not have to be defined, as is the case with some CUSUM techniques and GLR techniques.

The change-point detection module 100 next reports (at 330) the change-point detection result to a predefined destination. Any occurrence of a detected change point (or lack of detected change point) can be confirmed by a data source.

Note that a detected change point is indicative of a systematic change of the system that generated the time series of data values processed by the change-point detection module 100. The systematic change can occur as a result of some fundamental business or other type of change. Also, a systematic change can result from errors, such as infrastructure errors (e.g., hardware or software errors), data entry errors, and so forth. Therefore, a systematic change can be indicative of either a change in an organization or an error.

For each observed data value that is determined not to be an outlier, the corresponding subset $D_k$ is updated (at 332) by adding $y_t$ to the subset $D_k$. On the other hand, if a particular observed data value $y_t$ is determined to be an outlier, then the subset $D_k$ is not updated with the observed data value $y_t$. Next, based on the updated subsets $D_k$ the overall data set D is updated (at 334).

Note that the change-point detection module can also decline to add an observed data value to the corresponding subset $D_k$ if the data value is outside the 3σ range, as determined at 325. The reason that observed data values exhibiting low quality are not added to the data set D is that it is desirable for the mean values $\bar{y}^{(k)}$ calculated for each subset $D_k$ be based on accurate historical observed data values. In other words, the historical data set is maintained such that any updates to the historical data set are with accurate data values. The updated subsets and historical data set can be used to recompute mean values, residual values, and to perform subsequent change point detection on subsequently received data values.

Next, feedback loop control is performed (at 336), where the false alarm rate and detection delay rate are computed. Change-point detection using any of the algorithms discussed above may result in false detection of a change point (resulting in a false detection rate). Also, there may be a delay between when the change occurred and when the change point is detected (detection delay rate). The false detection rate and detection delay rate can be adjusted by changing the thresholds used in the CUSUM or GLR techniques, for example. Also, for more accurate outlier detections, the outlier range factor specified at 318 can also be adjusted.

Optionally, if change detection at other periodic aggregation levels (weekly, monthly, quarterly, annual, etc.), in addition to the change detection at the daily level discussed above, is desired, then tasks 302-308 are repeated (at 338) for the other periodic aggregation levels (at a time granularity level that is larger than the lowest time granularity level performed initially). In the example described above, the observed data values represent data values at the daily level—therefore, the lowest time granularity level in this example would be the daily time granularity level. Higher aggregated time granularity levels refer to the weekly level, monthly level, quarterly level, and so forth. For the higher aggregated time granularity level, the decomposition of the data set D separates the data set into different subsets (e.g., subsets corresponding to respective weeks, months, quarters, years, etc.). The predefined factors, mean values, and residual values are then computed for these subsets (304-308). In this case, the residual values represent adjusted data values for other time windows (e.g., weeks, months, quarters, years, etc.).

Next, trend change detection is performed (at 340) based on the computed residual values for the subsets for the different periodic aggregation level. "Trend change detection" refers to change detection performed at an aggregation level greater than the minimal level (e.g., daily level). Trend change detection can also use one of the change-point detection algorithms used at 328 (e.g., quality control chart technique, CUSUM technique, GLR technique, regression CUSUM technique, etc.). Any detected trend change (or lack thereof) is reported at (342) to a data source, which can confirm or contradict the report.

By using the change-point detection algorithm according to some embodiments, accurate change point detection can be achieved by removing temporal or other effects from observed data values. Moreover, in some embodiments, data quality determination can be performed at the lowest time granularity level (such as at a daily level) provided in the time series of observed data values. If desired, change-point detection and data quality determination can be performed at higher aggregated time granularity levels (e.g., weeks, months, quarters, etc.). Observed data values exhibiting data quality issues (e.g., data values that are outliers or that are outside the 3σ range) can be identified and removed from (or not added to) the data set to ensure accurate subsequent change-point detection.

Instructions of software described herein (e.g., change-point detection module 100 of FIG. 1) are loaded for execution on one or more processors (e.g., CPUs 102 of FIG. 1). The processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable or computer-useable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of detecting data change, comprising:
separating observed data values into plural sets representative of respective distinct time windows;
calculating, by at least one processor, predefined values representative of a temporal effect for the respective plural sets, wherein each of the predefined values is an aggregate value computed from the observed data values in the respective one of the sets;
calculating, by the at least one processor, adjusted data values by removing impact of the predefined values such that the temporal effect is removed from respective observed data values in the respective plural sets, wherein the adjusted data values associated with each of the plural sets are calculated based on a difference between the observed data values within the corresponding set and the corresponding aggregate value; and
detecting, by the at least one processor, the data change based on the adjusted data values.

2. The method of claim 1, wherein detecting the data change comprises applying a change-point detection algorithm based on the adjusted data values.

3. The method of claim 1, wherein the observed data values separated into the plural sets are part of a historical data set, the method further comprising:
receiving an additional observed data value;
calculating a further adjusted data value by subtracting one of the predefined values from the additional observed data value,
wherein detecting the data change is further based on the further adjusted data value.

4. The method of claim 1, wherein the observed data values comprise a time series of observed data values $y_t$ up to a time point N (t=1 to N), and
wherein calculating the predefined values comprises calculating the predefined values based on the time series of observed data values $y_t$ from t=1 to t=N.

5. The method of claim 1, further comprising determining whether any observed data value is an outlier by:
setting an upper value and a lower value in a respective set of the plural sets; and
determining that the observed data value is an outlier if the observed data value exceeds the upper value or is less than the lower value.

6. The method of claim 1, wherein detecting the data change comprises detecting a systematic change.

7. The method of claim 1, wherein detecting the data change identifies a change point at a lowest time granularity level provided by the observed data values.

8. The method of claim 1, wherein separating the observed data values into the plural sets representative of the respective distinct time windows comprises separating the observed data values into the plural sets representative of periodically repeating time windows.

9. The method of claim 2, wherein applying the change-point detection algorithm based on the adjusted data values comprises applying one of a cumulative sums (CUSUM) technique, a generalized likelihood ratio (GLR) technique, and a regression CUSUM technique.

10. The method of claim 3, further comprising performing a quality determination of the additional observed data value.

11. The method of claim 7, further comprising performing trend change detection at a higher aggregated time granularity level that is greater than the lowest time granularity level.

12. A method of detecting data change, comprising:
separating observed data values into plural sets representative of respective time windows;
calculating, by at least one processor, predefined values representative of a temporal effect for the respective plural sets;
calculating, by the at least one processor, adjusted data values by removing impact of the predefined values such that the temporal effect is removed from respective observed data values in the respective plural sets;
detecting, by the at least one processor, the data change based on the adjusted data values,
wherein the observed data values comprise a time series of observed data values $y_t$ up to a time point N (t=1 to N), and
wherein calculating the predefined values comprises calculating the predefined values based on the time series of observed data values $y_t$ from t=1 to t=N; and
receiving observed data values $y_t$ after time point N (t≧N+1),
wherein calculating the adjusted data values comprises calculating residual values $r_t$, t=1 to t≧N+1, where $r_t = y_t - \overline{y}^{(k)}$, $\overline{y}^{(k)}$ representing the predefined values, and k is a value from 1 to K, where K represents a number of the plural sets.

13. The method of claim 12, wherein the plural sets of observed data values correspond to K time windows, wherein each $y_t$ corresponds to a respective time window k, k=1 to K, and
wherein calculating each $r_t$ comprises selecting $\overline{y}^{(k)}$ from among $\overline{y}^{(1)}$ to $\overline{y}^{(K)}$ to subtract from the corresponding $y_t$.

14. The method of claim 13, wherein the time windows represent periodically repeating time windows, and wherein receiving each observed data value $y_t$ comprises receiving a data value that falls in one of the periodically repeating time windows.

15. The method of claim 13, wherein the plural time windows comprise the following time windows: Monday, Tuesday, Wednesday, Thursday, Friday, Saturday, Sunday, wherein 1 to K correspond to Monday to Sunday, and wherein each $y_t$ represents a data value occurring in one of Monday to Sunday.

16. A method of detecting data change, comprising:
separating observed data values into plural sets representative of respective time windows;
calculating, by at least one processor, predefined values representative of a temporal effect for the respective plural sets;
calculating, by the at least one processor, adjusted data values by removing impact of the predefined values such that the temporal effect is removed from respective observed data values in the respective plural sets;
detecting, by the at least one processor, the data change based on the adjusted data values;
determining whether any observed data value is an outlier by:
setting an upper value and a lower value in a respective set of the plural sets;
determining that the observed data value is an outlier if the observed data value exceeds the upper value or is less than the lower value,
wherein setting the upper value and lower value in the respective set comprises:
computing an upper quantile and a lower quantile;
computing an inter quantile that equals a difference between the upper quantile and lower quantile;
determining the upper value as a maximum data value in the set that is no greater than (upper quantile+inter quantile*outlier range factor), wherein outlier range factor is a predefined constant; and
computing the lower value as a minimum data value in the set that is no less than (lower quantile−inter quantile*outlier range factor).

17. A system comprising:
at least one processor to:
separate observed data values into plural subsets representing respective repeating time windows;
calculate indications of a temporal effect on respective observed data values in the respective subsets, wherein each of the indications is an aggregate value computed from the observed data values in the respective one of the plural subsets;
calculate adjusted data values by removing impact of the aggregate values such that the temporal effect is removed from respective observed data values in the respective plural subsets, wherein the adjusted data values associated with each of the plural subsets are calculated based on a difference between the observed data values within the corresponding subset and the corresponding aggregate value; and perform change point detection based on the adjusted data values.

18. The system of claim 17, wherein the at least one processor is configured to further:

receive at least one additional observed data value that corresponds to at least one of the plural subsets; and perform data quality determination of the at least one additional observed data value.

19. The system of claim 17, wherein the repeating time windows represented by the respective plural subsets are periodically repeating time windows.

20. A method of detecting data change, comprising:

separating observed data values into plural sets representative of respective distinct time windows;

calculating, by at least one processor, predefined values representative of a temporal effect for the respective plural sets;

calculating, by the at least one processor, adjusted data values by removing impact of the predefined values such that the temporal effect is removed from respective observed data values in the respective plural sets; and detecting, by the at least one processor, the data change based on the adjusted data values;

wherein separating the observed data values into the plural sets representative of the respective distinct time windows comprises separating the observed data values into the plural sets representative of periodically repeating time windows, wherein calculating the adjusted data values for each of the plural sets comprises calculating the adjusted data values based on the observed data values and the predefined value of the corresponding set, and wherein the adjusted data values for each of the plural sets comprise adjusted data values equal to respective differences between the observed data values and the predefined value of the corresponding set.

21. A system comprising:

at least one processor to:

separate observed data values into plural subsets representing respective repeating time windows;

calculate indications of a temporal effect on respective observed data values in the respective subsets; and perform change point detection by removing the temporal effect of the respective subsets from respective observed data values, wherein the temporal effect is removed from each of the subsets by calculating residual values that are based on the observed data values and the predefined value of the corresponding subset, and wherein the residual values for each of the subsets are equal to respective differences between the observed data values and the predefined value of the respective subset.

* * * * *